Aug. 11, 1942.    W. R. SCHMITZ, JR    2,292,901
SHREDDING METHOD AND APPARATUS
Filed June 1, 1940    2 Sheets-Sheet 1

INVENTOR
William Richard Schmitz, Jr.
BY
ATTORNEY

Aug. 11, 1942.  W. R. SCHMITZ, JR  2,292,901
SHREDDING METHOD AND APPARATUS
Filed June 1, 1940  2 Sheets-Sheet 2

INVENTOR
William Richard Schmitz, Jr.
BY
ATTORNEY

Patented Aug. 11, 1942

2,292,901

UNITED STATES PATENT OFFICE 2,292,901

SHREDDING METHOD AND APPARATUS

William Richard Schmitz, Jr., Buffalo, N. Y., assignor to E. I. du Pont de Nemours & Company, Wilmington, Del., a corporation of Delaware Application June 1, 1940, Serial No. 338,442

3 Claims. (Cl. 83—6)

This invention relates to an apparatus for the shredding of fibrous material in a continuous manner. More particularly, it relates to an apparatus for the continuous shredding of sheets or slabs of alkali cellulose.

Sheets, slabs or continuous board-like masses of alkali cellulose are generally produced by steeping raw, fibrous cellulosic material in an alkaline solution, such as sodium hydroxide, to convert the cellulose to alkali cellulose, and then pressing the fibrous alkali cellulose to remove the excess alkali therefrom. The pressed mass may be obtained in the form of comparatively small sheets or slabs, or in the form of a continuous board-like felted, fibrous mass. The sheets, slabs or board-like mass of alkali cellulose must be shredded to form a product which can be readily transformed into cellulosic solutions or dispersions with suitable reactants.

It is highly desirable that the alkali cellulose be shredded into a finely divided uniform mass. A shredder, in order to be entirely satisfactory for the shredding of alkali cellulose, should preferably operate in a continuous manner to open the pressed alkali cellulose to such a degree that substantially each and every fiber will be separated from adjacent or adhering fibers by such a distance that air, gases, or liquids will have free access to substantially all of the said fibers.

The shredder should be able to handle pressed masses of alkali cellulose in substantially any physical form, such as in the form of continuous boards or in the more common form of steeped pressed pulp sheets.

The shredder must be capable of receiving the pressed alkali cellulose mass at substantially any rate of speed, that is, it must not become jammed by a sudden overloading of the mechanism. The shredder should preferably operate to automatically reject material in excess of its intrinsic capacity.

The shredder must be self-cleaning in nature so that it can be satisfactorily operated in a continuous manner.

The shredder should have a low power consumption and should not require the use of large amounts of cooling brine.

The shredder should not require the circulation of air for the dissipation of heat generated during the shredding operation. In fact, it should be possible to enclose the shredder so that the alkali cellulose contained therein will be subjected to very little contact with air.

The shredder should require only occasional operative attention.

The previously known types of apparatus used for the shredding of alkali cellulose may, in general, be divided into two groups: the intermittent or batch shredders, and the continuous shredders. Shredder of the first type which operate intermittently to shred separate batches of alkali cellulose are deficient in one or more of the above-enumerated requirements and hence, are not generally satisfactory. In shredders of this type the shredding of the pressed alkali cellulose is generally accomplished by a combined compressing and shearing action. The product obtained from such shredders contains many small, dense pellets of alkali cellulose which pellets do not lend themselves readily, if at all, to a uniform after-treatment. It is believed that these pellets are formed as the result of the compressing action of the shredders. A further disadvantage of this type of shredder lies in the fact that it tends to jam on overloading and hence, it must be loaded slowly and carefully. A still further disadvantage lies in the tremendous amount of heat developed during the shredding action. Furthermore, this type of shredder has an exceedingly high power consumption.

Similarly, those shredders of the second type above referred to which have been developed and operated to shred the pressed alkali cellulose in a continuous manner also fail to satisfy some of the above-listed requirements of an ideal apparatus for the shredding of alkali cellulose. For example, the hammer mill type of shredder depends upon the circulation of a large volume of air for the dissipation of the heat generated during the shredding action. Such cooling air must be conditioned for use with alkali cellulose, first by the removal of carbon dioxide so as to prevent carbonation of the alkali cellulose and secondly, by the supply of a sufficient amount of moisture to prevent the drying of the particles at the temperature which exists in the region of shredding. The density of the shredded particles, caused by the severe compression at the area of impact, and the high local temperatures developed thereby contribute in producing the poor quality product obtained with this type of shredder.

Another previously known type of shredder consists of two opposed, toothed discs, one of which is revolving while the other is stationary. The material to be shredded is passed through an axial hole in the center of the stationary disc and the shredded material is discharged from its periphery. Such shredders are disadvantageous in that the material builds up between the teeth, eventually clogging them and necessitating the disassembly of the machine and the cleaning of the two discs. An important disadvantage of this type of shredder lies in the fact that some of the material caught in the teeth of the disc is held there only a short time, the material later passing on through the shredder but not, however, before it has become dried or carbonated on the surface to such an extent that it will not xanthate properly. Another definite disadvantage in this type of shredder lies in the fact that the alkali cellulose must be in the form of rather small particles, for example, sheets about one inch square, in order to be fed into the shredder.

According to still another previously known type of continuous shredder, the alkali cellulose is fed between two toothed rollers which so rotate in opposite directions that their surfaces, on the feed side of the bite between them, move toward the bite and hence, act together to draw the unshredded material into the bite. This construction, wherein the surface of each roller is moving, on the feed side, toward the bite, possesses a definite tendency to jam on overloading even though the speed of one of the rollers is so reduced as to make that roller a feeding roller rather than a shredding roller. Further, the teeth of such a slowly moving roller tend to become clogged with shredded material since the centrifugal force developed by the roller is not sufficient to throw off this material.

It is, therefore, an object of this invention to provide an apparatus for the shredding of alkali cellulose which apparatus will overcome the disadvantages of known shredders and will substantially comply with the above-enumerated requirements of a satisfactory shredder.

It is a further object of this invention to provide an apparatus for the shredding of alkali cellulose which will require very little operative attention and which will continuously shred sheets or continuous boards or slabs of alkali cellulose of varying sizes, which apparatus will not be subject to jamming and which will substantially open the alkali cellulose into its individual fibers as required.

Other objects of the invention will be apparent from the following description.

The objects of the invention are accomplished, in general, by an arrangement of three rollers properly disposed with regard to each other and to the feeding means of the shredder. The rollers are fitted with shredding surfaces and operate at a high speed in a manner that will hereinafter be more specifically set forth.

This invention will be made more clearly apparent by reference to the following detailed description when taken in connection with the accompanying illustrations, in which.

Figure 3:
Figure 4:
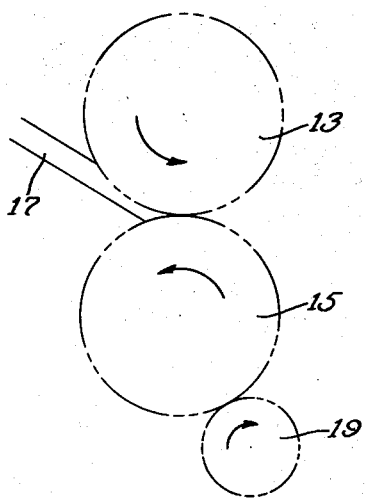
Figure 5:
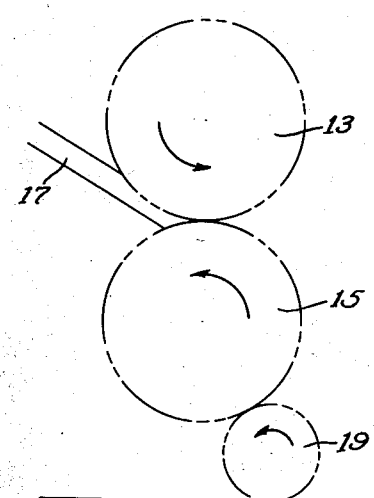

Figures 3, 4, and 5 are diagrammatic illustrations showing the relative rotation and position of the shredding and cleaning rollers and the angular position of the alkali cellulose material fed to the shredding rollers.

Figure 6:
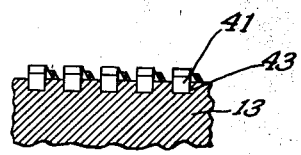

Figure 6 is an enlarged sectional view of a preferred construction of shredding roller.

Figure 7:
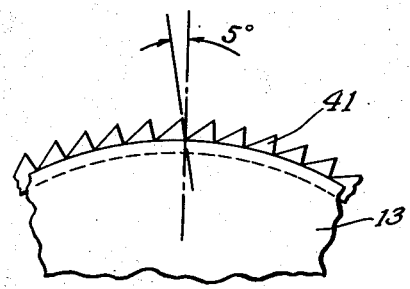

Figure 7 is an enlarged end view of a portion of a shredding roller showing the positioning of the shredding teeth.

Figure 8:
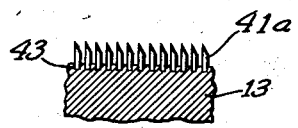

Figure 8 is a sectional view of a portion of a modified form of shredding roller.

Figure 9:

Figure 9 is a broken side elevational view and sectional view of a small length of Garnett wire for use as shredding teeth in accordance with the present invention.

Figure 1:
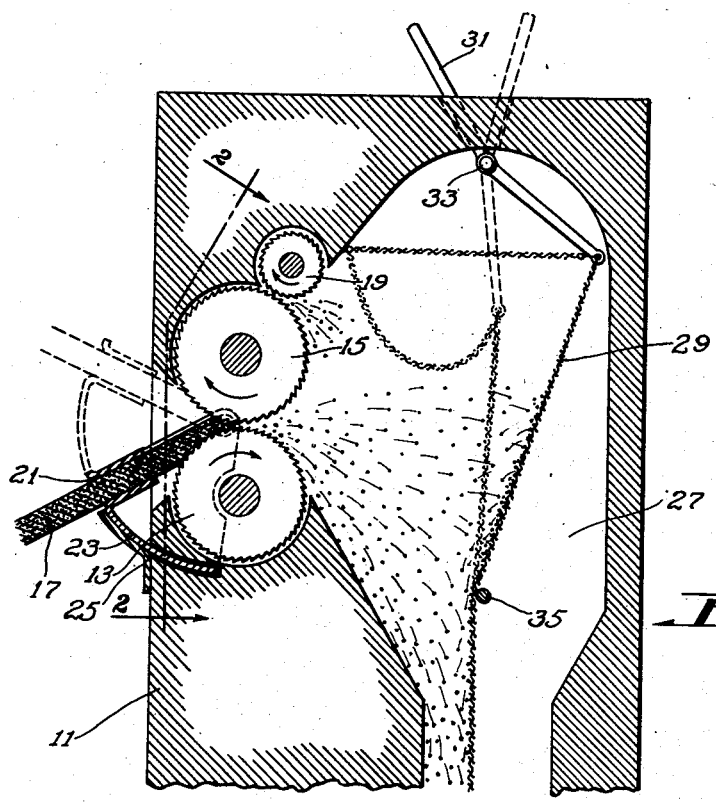
Figure 1 is a side elevational diagrammatic view showing the arrangement of the shredding rollers and the passage of the alkali cellulose material thereto.
Figure 2:
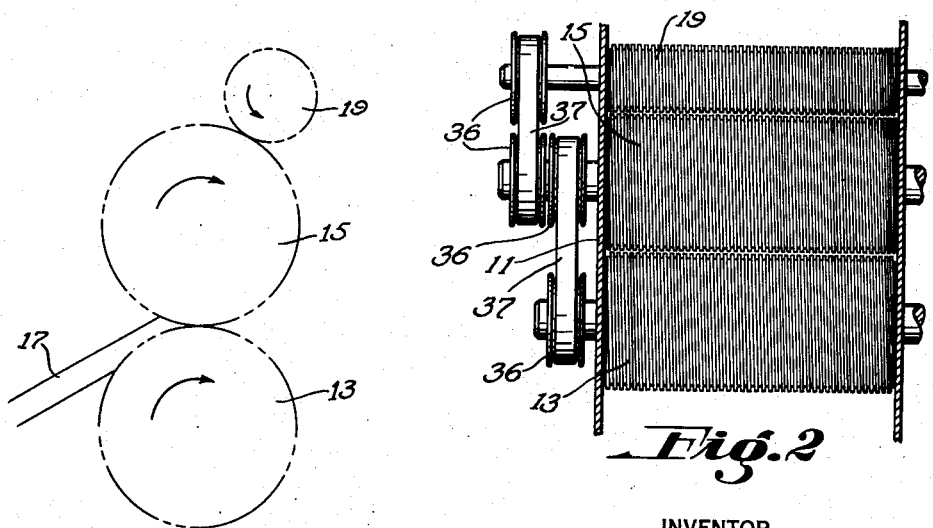
Figure 2 is a front view of the shredding rollers taken along the line 2—2 of Figure 1, with parts shown in section.

Referring to Figures 1 and 2 of the drawings, reference numeral 11 generally designates the frame of the shredding apparatus. Three toothed shredding rollers, 13, 15 and 19, are suitably positioned within the apparatus. An angularly adjustable guide 21 for the pulp sheet or board 17 is pivotally mounted to the frame 11 for movement adjacent the mouth of the apparatus. The guide 21 is provided with an arcuate section 23 which, upon pivotal movement of guide 21, is adapted to slide in close contact with the arcuate extension 25 connected to the frame of the apparatus. The apparatus contains a receiving hopper 27 for the shredded material. The hopper 27 is provided with a flexible curtain 29. The curtain 29 is suspended in the hopper and aids in passing the finely shredded material through the hopper. The curtain is attached to the frame 11 above roll 19 and is also attached to a handle 31 which is pivoted to the upper end of the apparatus. The handle 31 may be oscillated about its pivot point 33 to shake the curtain 29 so as to remove alkali cellulose adhering to the curtain. The curtain is preferably maintained near the center of the hopper by means of a fixed guide rod 35. The shredding rollers are driven at the same rotational speed and in the same direction of rotation by pulleys 36 of identical size positioned on the shafts of the rollers, the pulleys being connected by means of belts 37.

The primary shredding rollers, rollers 13 and 15, are mounted with their axes parallel and with very little clearance between their surfaces. These two rollers are driven in the same direction of rotation as shown by the arrows on the rollers and, consequently, the surface of roller 13, on the feed side, is moving into the bite between the rollers while the surface of roller 15, on the feed side, is moving away from the bite. This construction is fundamental and has the following significance:

The pressed sheet or slab 17 of alkali cellulose to be shredded is fed into the bite between these two rollers. The material may be fed in at such an angle that roller 13 contacts a greater surface of the sheet than does roller 15 and thus the former roller serves to feed the alkali cellulose into the bite. Alternatively, the roller 13 may be rotated at a higher peripheral speed than roller 15 thereby feeding the alkali cellulose into the bite. The shredder is thus self-feeding and the rate of feed may be varied simply by either altering the angle at which the pressed alkali cellulose is fed to the rollers or by altering the relative peripheral speeds of the two rollers.

The rotation of roller 15, whose surface, adjacent the bite, is moving in a direction opposite to that of the roller 13, tends to force the pressed sheet or slab of alkali cellulose 17 away from the bite and to lift it from roller 13. If the rate of feed becomes too rapid, roller 15 will lift the pressed sheet or slab slightly from feeding roller 13, thereby reducing the feeding force. Even if the feed is forced by auxiliary means, the slab cannot enter between the rollers and bind them as must occur if the surfaces of both rollers move toward the bite. The action of roller 15 also throws from the bite any foreign body that might accidentally be included in the feed. Thus, the direction of rotation of the rollers prevents any jamming of the alkali cellulose between them.

The alkali cellulose torn from the entering slab 17 by roller 13 passes through the bite of rollers 13 and 15 and emerges from the other side of the bite in a finely shredded form. That portion of the alkali cellulose that is torn from the slab 17 by roller 15 is carried away by that roller from the region of the bite and is further shredded by the interaction of roller 15 and the third, or auxiliary shredding roller 19.

The auxiliary shredding roller 19 is mounted with its axis parallel to the axes of the other two rollers and is positioned adjacent to roller 15. Its axis may or may not be in the plane defined by the axes of the other two rollers. Since the material coming to this roller has already been partially shredded, there is no tendency to jam at this point. Consequently, the direction of rotation of this roller with respect to the rotation of the other two rollers is not of prime importance. If roller 19 rotates in a direction opposite that of roller 15, as shown in Figures 3 and 4 of the drawings, the material is drawn into the bite between these rollers. In this case, it is best that these two rollers 15 and 19, have different peripheral speeds so that a shredding action will be obtained. If roller 19 rotates in the same direction as roller 15, as shown in Figures 1 and 5 of the drawings, it is best to have the peripheral speed of roller 19 lower than that of roller 15 so that most of the material brought to these rollers will pass between them. The remainder of the material will be carried from the bite by roller 19 but will, however, be effectively shredded by impact with this latter roller which acts, at high velocity, to change the direction of motion of the pulp.

The shredding rollers 13, 15, and 19 are each provided with a fine toothed shredding surface which is formed, according to the preferred embodiment of the invention, by winding a length of Garnett wire into a spiral groove formed in the surface of the roller, the wire being firmly positioned in the groove by soldering or welding or by any other suitable means. Garnett wire comprises a band having formed thereon a number of teeth, and resembles the blade of a band saw. Figures 6 to 9 of the accompanying drawings illustrate two types of Garnett wire 41 and 41a, and the manner in which such a Garnett wire may be positioned in a spiral groove 43 formed in the surface of a roller 13.

In the preferred construction, the two primary shredding rollers 13 and 15 are each made approximately 19 inches long with an outside diameter of about 8 inches. Garnett wire of the type shown in Figure 9 and having five teeth per linear inch is laid in a spiral groove making 12 turns per inch along the surface of the rollers as indicated in Figures 6 and 8. Thus, there are mounted on the surface of each roller approximately 1,500 teeth per linear inch of roller surface. By constructing the primary shredding rollers in this manner each successive, circumferentially adjacent tooth is offset laterally along the surface of the roller, from the preceding tooth by a distance of approximately 0.0007 of an inch so that in cutting a homogeneous material, the teeth would tend to produce a series of ribbons each only 0.0007 of an inch wide. Since this width is less than the width of the pulp and cotton fibers with which this invention is concerned, no such ribbon can form. Instead, the teeth tend to pull only small aggregates of fibers from the slab to yield a thoroughly shredded product.

The auxiliary shredding roller 19 is preferably made the same length as the primary shredding rollers, but has a diameter of only about 4 inches. It is fitted on the surface with Garnett wire identical to that in rollers 13 and 15, the wire again being wound 12 turns to the inch. Roller 19 is preferably offset, toward the interior of the shredding apparatus, to such an extent that a plane drawn through the axes of primary rollers 13 and 15 will form an angle of about 30° with a plane drawn through the axes of rollers 15 and 19. The shredding rollers are preferably positioned and rotated with respect to each other as shown in Figure 1. It is also preferred that the feeding roller 13 be located below the other primary roller 15, the auxiliary roller 19 being located above and offset toward the inside of the apparatus from roller 15. Good results may, however, be obtained by positioning, and rotating, the rollers with respect to each other in accordance with any of the diagrammatic representations shown in Figures 3, 4, and 5. The direction of feed of pulp sheet 17 illustrated in these figures is the one that will normally yield the most satisfactory results. If desired, means may be provided for changing the angle of feed. The clearance between the opposing teeth of the adjacent rollers 13 and 15, and of the adjacent rollers 15 and 19, is of the order of one-hundredth of an inch (.01").

If the feed of the alkali cellulose is to be governed by the angle at which the pressed alkali cellulose is fed to the rollers, all three rollers are preferably rotated in the same direction and at the same rotational speed, the peripheral speed of the two primary rollers 13 and 15 being the same while that of the auxiliary roller is much less. At the preferred speed of 4,000 R. P. M. for an 8" diameter roller, the teeth of the two primary rollers are seen to make a total of more than ten million cuts per minute per inch of roller length.

If the feed of the alkali cellulose is to be governed by the relative speeds of the primary rollers, the pressed alkali cellulose is preferably fed horizontally into the rollers so that both rollers will have equal surface contact with the alkali cellulose. In this case the primary rollers will be driven independently from each other.

In the case of the two primary rollers, it is preferred to have the cutting faces of the teeth of the Garnett wire sloped slightly backward as shown in Figure 7, wherein the cutting face of each tooth is seen to slope backward at an angle of 5° from a radial line drawn through the base of the tooth. This sloping of the teeth helps to prevent the packing or accumulation of alkali cellulose in the teeth and assists in the cleaning of them by centrifugal force.

In the case of the auxiliary roller, it is preferred to have the teeth mounted on the roller in a reverse direction so that the material coming into contact with this roller strikes against the back or dull sides of the teeth. This type of mounting gives additional protection against the packing of alkali cellulose in the teeth and is particularly advantageous in the case of the auxiliary roller because the centrifugal force developed by this smaller roller is much less than that developed by the larger primary rollers.

Because of the centrifugal force set up by the rotation of the rollers and the fact that the shredding teeth mounted on the surfaces of the rollers are relatively short, the small particles of shredded alkali cellulose do not become lodged in the shredding surfaces but are thrown clear of the teeth and into contact with the teeth of the opposing roller at the point of clearance between the two rollers, the particles thus being subjected to a tearing action. Thus, the high rotational speed of the rollers not only serves to make the shredding mechanism self-cleaning but also improves the shredding action.

On passing from the shredding rollers into the receiving hopper, the shredded particles of alkali cellulose are thrown by the centrifugal force of the rollers into the receiving hopper 27 and against the flexible curtain 29 located within the hopper. These particles of shredded alkali cellulose are moist and tend to cling to the curtain and form into large clumps of material, which become dried and aged before they drop from the curtain into the receiving means. The formation of such aggregates would constitute an undesirable feature in the preparation of a uniform product. The constant flexing of the curtain by the oscillatable handle 31 prevents such a formation, so that the shredding device is thus enabled to produce a finely shredded, uniform product of a satisfactory nature.

It is to be understood that the specific construction set forth above is merely illustrative and that many modifications can be made in it without departing from the nature and principles of the invention. For example, the shredding rollers may be constructed of any length desired or of any diameter desired. It is not necessary that the two primary rollers be of the same dimensions nor is it necessary that the auxiliary roller be of a smaller diameter than the other two rollers. It may be of the same or larger size. The rollers may rotate at any suitable speed dependent upon the diameter of the rollers and the size of the teeth, it being necessary only that the rotational speed of the rollers be great enough to develop sufficient centrifugal force to enable the rollers to be self-cleaning.

While the primary rollers must rotate in the same direction, the auxiliary roller may rotate in the same or opposite direction. If it rotates in the opposite direction, its peripheral speed should differ from that of its adjacent roller so that a shredding action may be obtained between the surfaces of the two rollers. Any suitable means may be used to vary the angle of feed of the pulp sheets. It is a fact that the shredder will operate in practically any position and the feed may satisfactorily be from the side, the bottom, or the top of the shredder unit.

Similarly, the mode of construction of the shredding surfaces of the rollers is capable of wide variation. For example, the form of the Garnett wire used in the above-preferred embodiment may be varied widely. The wire may have any desired number of teeth per inch and may be wound in a spiral groove of any desired path, pitch, or dimension. Or, it may be mounted in a series of circular grooves spaced along the length of the roller surface, or, again, teeth may be provided on the roller in any other desired manner. In its broadest aspects, the invention contemplates the passage of the material to be shredded between a pair of parallel shredding rollers fitted with roughened, macerating surfaces, the rollers being rotated in the same direction.

According to the preferred embodiment of the invention, the receiving hopper 27 is equipped with a flexible curtain 29 fitted with an oscillatable handle 31. The flexible curtain 29 and its oscillatable handle 31 are not essential parts of the invention and can be replaced by any other satisfactory means of preventing the freshly shredded material from clinging to the walls of the hopper. Or, again, the walls of the receiving hopper can be located at such a distance from the shredding rollers that the shredded material will not be thrown against the walls of the hopper.

Although the invention has been described with particular reference to the shredding of a continued pressed slab of alkali cellulose, the device will operate to satisfactorily shred alkali cellulose in practically any form, such as sheets, clumps and broken particles, or even partially shredded materials. If the alkali cellulose being fed is in the form of clumps or broken particles, the shredder may be so arranged that the particles will be fed into the shredder.

A shredder constructed in accordance with the present invention will reduce alkali cellulose or similar fibrous material into particles of very small size and open structure. Alkali cellulose produced in this shredder, when xanthated and made into viscose, has been found to give superior filtration results as compared with alkali cellulose produced in apparatus of the types known prior to this invention. The shredder has been used to shred successfully alkali cellulose in the form of a continuous homogeneous slab, or in the form of broken portions of such a slab, or as a pack of pressed pulp sheets.

The shredder may be very simply enclosed so there is little contact with air, and, consequently, little danger of drying or carbonation of the alkali cellulose.

Furthermore, alkali cellulose shredded in this device is not heated during the shredding operation to such a degree as to require the use of a cooling medium.

The shredder rollers of the present invention will always clear themselves of any adhering alkali cellulose and at no time is there any tendency to jam either because of excessive rates of feed or because of the presence of foreign materials in the incoming alkali cellulose.

Such a shredder as is contemplated by this invention will operate with an exceedingly low power consumption in comparison to previously known types of shredders.

It is, therefore, obvious that the present invention meets all the requirements of a continuous shredder as set forth above in a design of simple and rugged construction using little power and requiring much less expense both in first cost and in maintenance than previously known shredding equipment.

Since it is obvious that many changes and modifications can be made in the details above-described without departing from the nature and spirit of the invention, it is to be understood that the invention is not to be limited to these details except as set forth in the following claims.

I claim:

1. The method of shredding a board of alkali cellulose which comprises passing the same between cylindrical toothed shredding rollers one of which pulls the alkali cellulose board into contact with said rollers and one of which tends to push against the moving board of alkali cellulose, and rotating said rollers at a peripheral speed of the order of 100,000 inches per minute.

2. In an apparatus for the shredding of a board of fibrous material, a pair of parallel cylindrical toothed shredding rollers positioned to rotate closely adjacent to each other to shred said board in the bite between said rollers, means for rotating said rollers in the same direction of rotation, whereby one of said rollers tends to pull the board into said bite and the other roller tends to push against the board entering said bite, means for guiding said board to the bite between said rollers, and means for varying the angle of approach of said board to said bite whereby to vary the rate of feed of said board.

3. In an apparatus as defined in claim 2 in which a third cylindrical toothed shredding roller is positioned to rotate adjacent that roller tending to push against the said board whereby to shred any material drawn into said shredding apparatus by the last-named roller.

WILLIAM R. SCHMITZ, Jr.